US008958383B2

(12) United States Patent
Fu et al.

(10) Patent No.: US 8,958,383 B2
(45) Date of Patent: Feb. 17, 2015

(54) METHOD FOR TRANSMITTING HARQ-ACK INFORMATION BASED ON TRANSMISSION DIVERSITY

(71) Applicant: Samsung Electronics Co., Ltd., Gyeonggi-do (KR)

(72) Inventors: Jingxing Fu, Beijing (CN); Chengjun Sun, Beijing (CN)

(73) Assignee: Samsung Electronics Co., Ltd (KR)

( * ) Notice: Subject to any disclaimer, the term of this patent is extended or adjusted under 35 U.S.C. 154(b) by 101 days.

(21) Appl. No.: 13/735,630

(22) Filed: Jan. 7, 2013

(65) Prior Publication Data

US 2013/0176918 A1    Jul. 11, 2013

(30) Foreign Application Priority Data

Jan. 6, 2012 (CN) .......................... 2012 1 0003031

(51) Int. Cl.
| | |
|---|---|
| *H04W 4/00* | (2009.01) |
| *H04W 72/04* | (2009.01) |
| *H04L 1/18* | (2006.01) |
| *H04B 7/04* | (2006.01) |
| *H04B 7/06* | (2006.01) |
| *H04L 1/04* | (2006.01) |
| *H04L 5/00* | (2006.01) |

(52) U.S. Cl.
CPC ............. *H04W 72/04* (2013.01); *H04L 1/1812* (2013.01); *H04B 7/0404* (2013.01); *H04B 7/0413* (2013.01); *H04B 7/0623* (2013.01); *H04L 1/04* (2013.01); *H04L 1/1854* (2013.01); *H04L 5/001* (2013.01); *H04L 5/0055* (2013.01)

USPC .......................................... 370/329

(58) Field of Classification Search
CPC .. H04B 7/0404; H04B 7/0413; H04B 7/0623; H04W 72/04
USPC .......................................... 370/280, 329, 281
See application file for complete search history.

(56) References Cited

U.S. PATENT DOCUMENTS

| | | | |
|---|---|---|---|
| 2009/0042558 A1 | 2/2009 | Shen et al. | |
| 2009/0055703 A1 | 2/2009 | Kim et al. | |
| 2011/0090825 A1 | 4/2011 | Papasakellariou et al. | |
| 2011/0194525 A1 | 8/2011 | Nishio et al. | |
| 2011/0299489 A1* | 12/2011 | Kim et al. ..................... | 370/329 |
| 2011/0305284 A1 | 12/2011 | Mueck et al. | |
| 2012/0039280 A1* | 2/2012 | Chen et al. ..................... | 370/329 |
| 2012/0106478 A1* | 5/2012 | Han et al. ..................... | 370/329 |
| 2013/0279432 A1* | 10/2013 | Li et al. ........................ | 370/329 |

* cited by examiner

*Primary Examiner* — Albert T Chou
(74) *Attorney, Agent, or Firm* — The Farrell Law Firm, P.C.

(57) ABSTRACT

A method for transmitting HARQ-ACK information based on transmission diversity is provided. The method includes configuring two component carriers, referred to as Cells, for a User Equipment (UE); when a base station configures the UE to transmit HARQ-ACK information adopting the transmission diversity technique, the base station indicates dynamically whether an other Cell is scheduled in the same subframe via a PDCCH scheduling a PDSCH of one Cell, so as to enable the UE to know the number of Cells scheduled in the same downlink subframe by the base station, and to generate HARQ-ACK information based on the number of Cells. Unnecessary spatial bundling of the HARQ-ACK information may be avoided, unnecessary downlink data retransmission is reduced and throughput of downlink data is improved.

40 Claims, 2 Drawing Sheets

METHOD FOR TRANSMITTING HARQ-ACK INFORMATION BASED ON TRANSMISSION DIVERSITY

PRIORITY

This application claims priority under 35 U.S.C. §119(a) to a Chinese patent application filed in the Chinese Patent Office on Jan. 6, 2012 and assigned Serial No. 201210003031.3, the entire disclosure of which is hereby incorporated by reference.

BACKGROUND OF THE INVENTION

1. Field of the Invention

The present invention generally relates to radio communication techniques, and more particularly, to a method for transmitting Hybrid Automatic Retransmission reQuest-ACKnowledgement (HARQ-ACK) information based on transmission diversity.

2. Description of the Related Art

Existing Long Term Evolution (LTE) systems have a maximum bandwidth of 20 MHz which cannot meet the requirement of higher data rates. Currently, in order to increase transmission rates of users, LTE-Advanced (LTE-A) has been proposed, based on LTE. In LTE-A systems, multiple Component Carriers (CCs) are combined to provide a wide working bandwidth and form a downlink and uplink of a communication system, so as to provide higher transmission rates. This technique is referred to as a Carrier Aggregation (CA) technique. For example, in order to support 100MHz bandwidth, five CCs of 20MHz may be combined. Hereinafter, each CC is referred to as a Cell.

Among multiple downlink Cells configured by a base station, one is a Primary Cell (Pcell) and others are Secondary Cells (Scells). The base station configures the UE to receive downlink data from multiple CCs through higher layer signaling. The number of Cells actually scheduled in one subframe may be less than or equal to the number of Cells configured by the higher layer. For example, in FIG. 1, two Cells are configured by the higher layer, respectively, Cell 1 and Cell 2, whereas the base station actually schedules one Cell, i.e. Cell 1.

The data transmission in one downlink Cell may be scheduled by a Physical Downlink Control CHannel (PDCCH) transmitted in another Cell, which is referred to as cross-carrier scheduling. The data transmission in one downlink Cell may also be scheduled by the PDCCH transmitted in the same Cell, which is referred to as non-cross-carrier scheduling, as shown in FIG. 2.

Based on the CA technique, the base station transmits downlink data to the same UE on multiple Cells. Accordingly, the UE needs to return HARQ-ACK information in response to the downlink data transmitted on the multiple Cells. According to current discussions involving LTE-A, the HARQ-ACK information of the downlink data of Cells within one CA is transmitted in one uplink Cell (i.e. uplink Pcell). In order to support the transmission of HARQ-ACK information of multiple bits, at most 4 bits of HARQ-ACK information may be transmitted in LTE-A adopting a channel selection based method, which has been used in LTE Time Division Duplexing (TDD) systems. When the channel selection of a single antenna is considered, the number of bits of HARQ-ACK information to be allocated is equal to the number of the HARQ-ACK bits. For simplicity, suppose there are M bits of HARQ-ACK information, and M HARQ-ACK channels are allocated accordingly.

Since each HARQ-ACK channel has four available Quadrature Phase Shift Keying (QPSK) constellations, 4M channel and constellation resources are obtained. Appropriate channel and constellation resources may be selected from the 4M resources for returning the M bits information.

According to the current discussions regarding LTE-A, in LTE-A Frequency Division Duplexing (FDD) systems, the channel selection method supports only aggregation of two Cells and each Cell may return 1-bit or 2-bit HARQ-ACK information. The method for allocating the HARQ-ACK channel resource is as follows.

For a downlink Pcell, the HARQ-ACK channel used by the HARQ-ACK information of the Pcell is determined according to a Control Channel Element (CCE) index of the PDCCH via a connotative method.

For a downlink Scell, if the Scell is not cross-carrier scheduled from the PDCCH of the Pcell, the HARQ-ACK channel used by the HARQ-ACK information of the Scell is determined according to a HARQ-ACK Resource Information (ARI) in the PDCCH of the Scell; if the Scell is cross-carrier scheduled from the PDCCH of the Pcell, the HARQ-ACK channel used by the HARQ-ACK information of the Scell is determined via a connotative method according to the CCE index of the PDCCH.

If the Cell is configured with a Single Input Multiple Output (SIMO) transmission mode, since it is only required to return one HARQ-ACK with respect to one Transmission Block (TB) of the Cell, one HARQ-ACK channel needs to be allocated. Accordingly, if the Cell is configured with a Multiple Input Multiple Output (MIMO) transmission mode, two HARQ-ACK need to be returned with respect to two TBs of the Cell. Therefore, two HARQ-ACK channels need to be allocated. As to the situation of allocating HARQ-ACK channels via the connotative method, the HARQ-ACK channel used by the HARQ-ACK information of one Cell is obtained through the PDCCH scheduling the data transmission of the Cell. In particular, the index of a first CCE of the PDCCH is denoted as $n_{CCE}$. If one HARQ-ACK channel needs to be allocated, the HARQ-ACK channel may be mapped according to the index $n_{CCE}$ of the first CCE. If two HARQ-ACK channels need to be allocated, the two HARQ-ACK channels may be mapped according to the first CCE index $n_{CCE}$ and the second CCE index $n_{CCE}+1$.

According to the current discussions regarding LTE or LTE-A Release 10 (Rel-10), if two Cells are both configured with the MIMO transmission mode, four HARQ-ACK bits will be generated. If the Physical Uplink Control CHannel (PUCCH) format 1b with channel selection is adopted for transmission, four PUCCH resources are required. If a Spatial Orthogonal Resource Transmission Diversity (SORTD) method is adopted, eight PUCCH resources are required. According to the discussions regarding LTE-A, the number of PUCCH resources does not exceed 4 when transmission diversity is adopted.

In order to solve the above problem, one current method is as follows: if the Cell is configured with the MIMO transmission mode, two HARQ-ACK bits of each CC is converted into one bit through spatial bundling. Thus, two HARQ-ACK bits are generated for 2 CCs. Then, the two bits are mapped according to Table 1.

TABLE 1

| HARQ-ACK(0) | HARQ-ACK(1) | $n_{PUCCH,i}^{(1)}$ | b(0)b(1) |
|---|---|---|---|
| ACK | ACK | $n_{PUCCH,1}^{(1)}$ | 1, 1 |
| ACK | NACK/DTX | $n_{PUCCH,0}^{(1)}$ | 1, 1 |

TABLE 1-continued

| HARQ-ACK(0) | HARQ-ACK(1) | $n_{PUCCH,i}^{(1)}$ | b(0)b(1) |
|---|---|---|---|
| NACK/DTX | ACK | $n_{PUCCH,1}^{(1)}$ | 0, 0 |
| NACK | NACK/DTX | $n_{PUCCH,0}^{(1)}$ | 0, 0 |
| DTX | NACK/DTX | | No transmission |

In Table 1:
"ACK" denotes that the content of HARQ-ACK information directly generated by the UE for a Cell or generated through spatial bundling for the Cell is positive acknowledgement;
"NACK" denotes that the content of HARQ-ACK information directly generated by the UE for a Cell or generated through spatial bundling for the Cell is negative acknowledgement;
"DTX" denotes that the UE does not receive data on the Cell;
$n_{PUCCH,i}^{(1)}$ denotes the channel used for transmitting the HARQ-ACK information; and
b(0)b(1) denotes the HARQ-ACK bits transmitted. HARQ-ACK (0) is HARQ-ACK information from the Pcell, and HARQ-ACK(1) is HARQ-ACK information from the Scell.

When being transmitted on antenna 0, $n_{PUCCH,0}^{(1)}$ is a channel mapped by the index $n_{CCE}$ of the first CCE of the PDCCH scheduling the Physical Downlink Shared CHannel (PDSCH) of the PCell via the connotative method, $n_{PUCCH,1}^{(1)}$ is a channel mapped by the index $n_{CCE}$ of the first CCE of the PDCCH scheduling the PDSCH of the Scell or the first channel indicated by the ARI in the PDCCH scheduling the PDSCH of the Scell.

When being transmitting on antenna 1, $n_{PUCCH,0}^{(1)}$ is a channel mapped by the index $n_{CCE}$ of the second CCE of the PDCCH scheduling the PDSCH of the Pcell, $n_{PUCCH,1}^{(1)}$ is a channel mapped by the index $n_{CCE}$ of the second CCE of the PDCCH scheduling the PDSCH of the Scell or the second channel indicated by the ARI in the PDCCH scheduling the PDSCH of the Scell.

Information transmitted on antenna 0 and antenna 1 is the same.

According to the current discussions regarding LTE-A, in LTE-A TDD systems, if the HARQ-ACK bundling window is 1, the same method as the FDD is adopted, and the HARQ-ACK information are mapped according to the method shown in Table 2.

TABLE 2

| HARQ-ACK(0), HARQ-ACK(1) | $n_{PUCCH}^{(1)}$ | b(0)b(1) |
|---|---|---|
| ACK, ACK | $n_{PUCCH,1}^{(1)}$ | 1, 0 |
| ACK, NACK/DTX | $n_{PUCCH,0}^{(1)}$ | 1, 1 |
| NACK/DTX, ACK | $n_{PUCCH,1}^{(1)}$ | 0, 1 |
| NACK, NACK/DTX | $n_{PUCCH,0}^{(1)}$ | 0, 0 |
| DTX, NACK/DTX | | No transmission |

SUMMARY OF THE INVENTION

The present invention has been made to overcome the above problems and/or disadvantages and to provide the advantages below. Accordingly, aspects of the present invention provide a method for transmitting HARQ-ACK information based on transmission diversity.

Aspects of the present invention provide a method for transmitting HARQ-ACK information based on transmission diversity, so as to avoid spatial bundling from being used when there is only one CC scheduled, and to reduce unnecessary downlink data retransmission and improve throughput of downlink data.

According to an aspect of the present invention, a method for transmitting, by a User Equipment (UE), HARQ-ACK information based on transmission diversity is provided. The method includes obtaining from a Physical Downlink Control Channel (PDCCH) number of Cells scheduled by a base station in a same downlink subframe; receiving downlink data from the base station in the downlink subframe, generating HARQ-ACK information according to the number of Cells and based on whether the downlink data is correctly received; and transmitting the generated HARQ-ACK information to the base station adopting a transmission diversity technique.

If the number of Cells scheduled by the base station in the downlink subframe is 2, the UE generates the HARQ-ACK information via spatial bundling manner for a Cell configured with a Multiple Input Multiple Output (MIMO) transmission mode.

The UE obtains from the PDCCH scheduling the downlink subframe of any one of the two Cells, an indication of whether another Cell is scheduled in the downlink subframe, so as to determine the number of Cells scheduled by the base station in the same downlink subframe.

When the two component carriers are carriers in a Time Division Duplex (TDD) system with a HARQ-ACK bundling window of 1, the UE obtains the indication from an existing bit in the PDCCH or from a padding bit in the PDCCH or from a newly-added bit in the PDCCH.

The UE obtains a Downlink Assignment Index (DAI) from the PDCCH scheduling the PDSCH and recognizes the DAI as the indication.

When the two component carriers are carriers in a Frequency Division Duplex (FDD) system, the UE obtains the indication in a padding bit or a newly-added bit in the PDCCH.

Generating the HARQ-ACK information includes, if the UE receives from the base station PDCCH information of only one Cell and the indication in the PDCCH indicates that the other Cell is not scheduled in the same downlink subframe, if the Cell being scheduled is configured with a Single Input Multiple Output (SIMO) transmission mode, one HARQ-ACK bit for the downlink subframe of the Cell is generated; and if the Cell being scheduled is configured with the MIMO transmission mode, two HARQ-ACK bits for the downlink subframe of the Cell are generated.

Generating the HARQ-ACK information also includes, if the UE receives from the base station PDCCH information of only one Cell but the indication in the PDCCH indicates that the other Cell is scheduled in the same downlink subframe, if the Cell whose PDCCH information is received is configured with the SIMO transmission mode, one HARQ-ACK bit for the downlink subframe of the Cell is generated; and if the Cell whose PDCCH information is received is configured with the MIMO transmission mode, two HARQ-ACK bits for the downlink subframe of the Cell are generated, the two HARQ-ACK bits are bundled into one bit, and HARQ-ACK information indicating DTX for the other Cell is generated.

Generating the HARQ-ACK information also includes, if the UE receives from the base station PDCCH information of two Cells and the indication in the PDCCH of each of the two Cells indicates that the other Cell is scheduled in the same downlink subframe, for the Cell configured with the SIMO transmission mode, one HARQ-ACK bit for the downlink subframe of the Cell is generated; and for the Cell configured with MIMO transmission mode, two HARQ-ACK bits for the downlink subframe of the Cell are generated, and the two HARQ-ACK bits are bundled into one bit.

Transmitting the generated HARQ-ACK information to the base station adopting the transmission diversity technique by the UE includes adopting a Spatial Orthogonal Resource Transmission Diversity (SORTD) method, and transmitting the generated HARQ-ACK information in duplicate on antenna 0 and antenna 1.

Transmitting the generated HARQ-ACK information also includes, if the Cell being scheduled is a Primary Cell (Pcell), if the downlink subframe of the Pcell being scheduled transmits a Semi-Persistent Scheduling (SPS) service, obtaining two channels for transmitting the HARQ-ACK information through semi-static configuration of higher layers, wherein antenna 0 and antenna 1 respectively transmit on the two channels; otherwise, antenna 0 transmits on a HARQ-ACK channel mapped according to $n_{CCE}$, and antenna 1 transmits on a HARQ-ACK channel mapped according to $n_{CCE}+1$, wherein $n_{CCE}$ denotes the index of the first CCE of the PDCCH;

Transmitting the generated HARQ-ACK information also includes, if the Cell being scheduled is a Secondary Cell (Scell), if the PDSCH of the Scell is cross-carrier scheduled from the PDCCH of the Pcell, antenna 0 transmits on the HARQ-ACK channel mapped according to $n_{CCE}$ and antenna 1 transmits on the HARQ-ACK channel mapped according to $n_{CCE}+1$. If the PDSCH of the Scell is non-cross-carrier scheduled from the PDCCH of the Scell, two channels are indicated by HARQ-ACK Resource Information (ARI) in the PDCCH, and antenna 0 and antenna 1 respectively transmit on the two channels.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
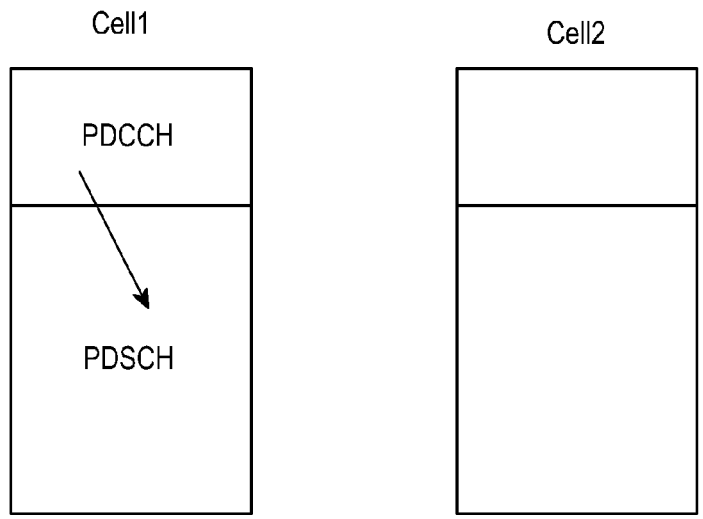
FIG. 1 is a schematic diagram illustrating scheduling of one Cell by a base station according to the prior art.
Figure 2:
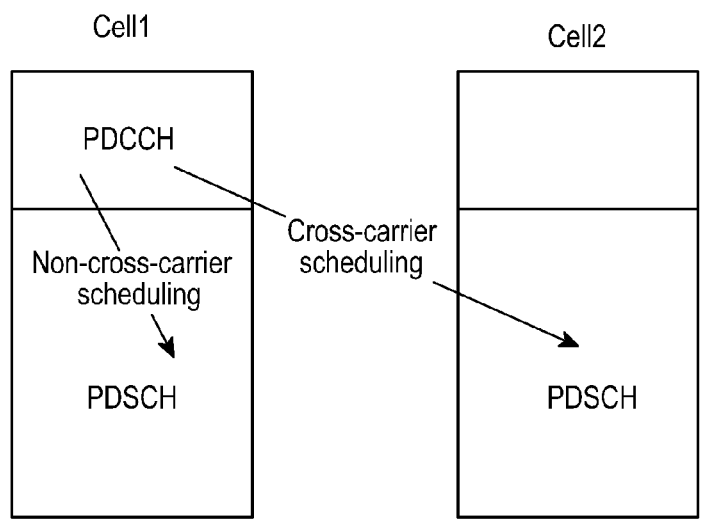
FIG. 2 is a schematic diagram illustrating cross-carrier scheduling and non-cross-carrier scheduling according to an embodiment of the present invention.

Hereinafter, embodiments of the present invention will be described with reference to the accompanying drawings. In the following description, identical elements will be designated by identical reference numerals throughout the drawings. Further, in the following description of the present invention, a detailed description of associated known functions or elements will be omitted for the sake of clarity and conciseness.

The present invention is applicable to a scenario in which a UE is configured with two serving-Cells and the base station configures the UE to transmit HARQ-ACK information adopting the transmission diversity technique. As previously noted, each component carrier (CC) is referred to in the following description as a "Cell".

For the above scenario, the present invention provides a method for transmitting HARQ-ACK information based on transmission diversity. In the method, the number of Cells scheduled by the base station in the same downlink subframe is dynamically indicated by the PDCCH, and the UE determines whether to implement spatial bundling to the HARQ-ACK information according to the number of Cells scheduled by the base station. If two Cells are scheduled, spatial bundling is performed on the HARQ-ACK information of the Cell configured with a MIMO transmission mode and the HARQ-ACK information is transmitted adopting the transmission diversity technique. If only one Cell is scheduled, spatial bundling is not performed on the HARQ-ACK information and the HARQ-ACK information is directly transmitted adopting the transmission diversity technique. Thus, performing spatial bundling on the HARQ-ACK information is avoided when there is only one Cell is scheduled. Confusion between the UE and the base station is also avoided.

During spatial bundling, the two bits of {ACK, NACK} or {NACK, ACK} will be bundled into one bit of {NACK}, and two bits of {ACK, DTX} or {DTX, ACK} will be bundled into one bit of {DTX}, which results in that a downlink subframe having been correctly received has to be retransmitted with a downlink subframe not correctly received. In contrast to this, the present invention avoids unnecessary spatial bundling of the HARQ-ACK information, thereby reducing unnecessary retransmission of downlink data and improving throughput of downlink data.

Figure 3:
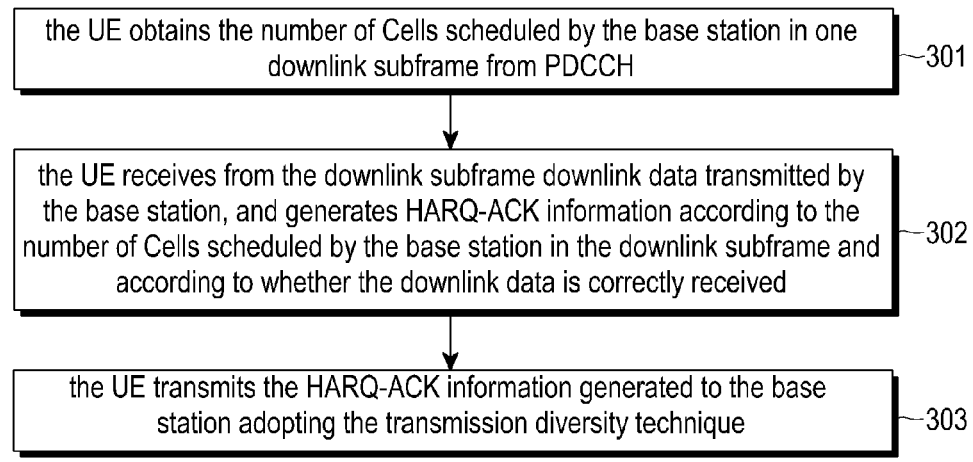
FIG. 3 is a flowchart illustrating a method according to an embodiment of the present invention.

Referring now to FIG. 3, FIG. 3 is a flowchart illustrating a method according to an embodiment of the present invention.

In Step 301, the UE obtains the number of Cells scheduled by the base station in one downlink subframe from PDCCH.

When a downlink subframe of a Cell is scheduled, the base station has to transmit a corresponding PDCCH to realize the scheduling. Based on this, the present invention provides that, when the downlink subframe of a Cell is scheduled, the base station indicates whether another Cell is scheduled in the downlink subframe through the PDCCH scheduling the downlink subframe, i.e., indicating data of another CC is scheduled in the downlink subframe. Thus, the UE may be aware of the number of CCs scheduled by the base station in the downlink subframe.

Suppose the CA system configures two Cells, one being the Pcell and the other being the Scell. HARQ-ACK information is transmitted using PUCCH format 1b with channel selection, and the HARQ-ACK information is transmitted adopting the transmission diversity technique of SORTD.

In order to indicate the number of Cells scheduled by the base station in the same downlink subframe through PDCCH, the present invention provides two preferable indicating methods.

The first indicating method is applicable for FDD systems and TDD systems with a HARQ-ACK bundling window of 1. Through adding one information bit in the PDCCH or utilizing one padding bit of the PDCCH, it is able to indicate whether one Cell or two Cells are scheduled in the current subframe. This bit is referred to as a Number of Scheduling Cells (NSC) bit.

For example, it may be defined that the value "0" of the NSC denotes that only one Cell is scheduled in the current subframe, and the value "1" of the NSC denotes that two Cells are scheduled in the current subframe. If only the Pcell is scheduled in the current subframe and the Scell is not scheduled, the NSC of the PDCCH scheduling the Pcell data is configured to 0. If only the Scell is scheduled in the current subframe and the Pcell is not scheduled, the NSC of the PDCCH scheduling the Scell data is also configured to 0. If both the Pcell and the Scell are scheduled in the current subframe, the NSC in the PDCCH scheduling the Pcell data and the NSC in the PDCCH scheduling the Scell data are respectively configured to 1.

The second indicating method is applicable for only TDD systems with a HARQ-ACK bundling window of 1. Through redefining a Downlink Assignment Index (DAI) field of the PDCCH, it is able to indicate whether one Cell or two Cells are scheduled in the current subframe. In the present invention, the DAI field is redefined as the Number of Scheduling Cells (NSC).

For example, it may be defined that, value "00" of the NSC denotes that only one Cell is scheduled in the current subframe, the value "11" of the NSC denotes that two Cells are scheduled in the current subframe, and the value "01" and "10" of the NSC are reserved for later use. If only the Pcell is scheduled in the current subframe and the Scell is not scheduled, the NSC in the PDCCH scheduling the Pcell data is configured to "00". If only the Scell is scheduled in the current subframe and the Pcell is not scheduled, the NSC in the PDCCH scheduling the Scell data is also configured to "00". If both the Pcell and the Scell are scheduled in the current subframe, the NSC in the PDCCH scheduling the Pcell data and the NSC in the PDCCH scheduling the Scell data are respectively configured to "11".

In Step 302, the UE receives from the downlink subframe downlink data transmitted by the base station, and generates HARQ-ACK information according to the number of Cells scheduled by the base station in the downlink subframe and according to whether the downlink data is correctly received.

If the first indicating method in step 301 is adopted, in this step, the processing of the UE includes, if the UE receives the PDCCH information of one Cell and the NSC in the PDCCH is "0", the UE determines that the base station schedules only one Cell. At this time, if the Cell is configured with the SIMO transmission mode, one HARQ-ACK bit is generated based on whether the downlink subframe is correctly received; if the Cell is configured with the MIMO transmission mode, two HARQ-ACK bits are generated based on whether the downlink subframe is correctly received.

If the UE receives from the base station PDCCH information of one Cell but the NSC value in the PDCCH is "1", the UE determines that the base station schedules both the Pcell and the Scell and the Cell corresponding to the PDCCH information not received has not been detected. At this time, if the Cell corresponding to the received PDCCH information is configured with the SIMO transmission mode, one HARQ-ACK bit is generated based on whether the downlink subframe corresponding to the Cell is correctly received. If the Cell corresponding to the received PDCCH information is configured with the MIMO transmission mode, two HARQ-ACK bits are generated based on whether the downlink subframe corresponding to the Cell is correctly received, and the two HARQ-ACK bits are bundled into one HARQ-ACK bit through spatial bundling. At the same time, HARQ-ACK information denoted as "DTX" or "not received" is generated for the Cell that has failed to be detected.

If the UE received from the base station the PDCCH information of both the Pcell and the Scell and the NSC values in both the PDCCH of the Pcell and the Scell are "1", the UE determines that the base station schedules both the Pcell and the Scell. At this time, for a Cell configured with the SIMO transmission mode, one HARQ-ACK bit is generated based on whether the downlink subframe corresponding to the Cell is correctly received. For a Cell configured with the MIMO transmission mode, two HARQ-ACK bits are generated based on whether the downlink subframe corresponding to the Cell is correctly received, and the two HARQ-ACK bits are bundled into one HARQ-ACK bit through spatial bundling. Thus, the final result is that one HARQ-ACK bit is generated for each Cell and there are two HARQ-ACK bits for the two Cells.

If the second indicating method in Step 301 is adopted, in this step, the processing of the UE includes:

If the UE receives the PDCCH information of one Cell and the NSC value in the PDCCH is "00", the UE determines that the base station schedules only one Cell. At this time, if the Cell is configured with the SIMO transmission mode, one HARQ-ACK bit is generated according to whether the downlink subframe is correctly received; if the Cell is configured with the MIMO transmission mode, two HARQ-ACK bits are generated according to whether the downlink subframe is correctly received.

If the UE receives from the base station PDCCH information of one Cell but the NSC value in the PDCCH is "11", the UE determines that the base station schedules both the Pcell and the Scell, and the Cell corresponding to the PDCCH information that is not received is undetected. At this time, if the Cell corresponding to the received PDCCH information is configured with the SIMO transmission mode, one HARQ-ACK bit is generated based on whether the downlink subframe corresponding to the Cell is correctly received. If the Cell corresponding to the received PDCCH information is configured with the MIMO transmission mode, two HARQ-ACK bits are generated based on whether the downlink subframe corresponding to the Cell is correctly received, and the two HARQ-ACK bits are bundled into one HARQ-ACK bit through spatial bundling. At the same time, HARQ-ACK information designated as DTX is generated for the Cell that has failed to be detected.

If the UE received from the base station the PDCCH information of both the Pcell and the Scell, and the NSC values in both the PDCCH of the Pcell and the Scell are "11", the UE determines that the base station schedules both the Pcell and the Scell. At this time, for a Cell configured with the SIMO transmission mode, one HARQ-ACK bit is generated based on whether the downlink subframe corresponding to the Cell is correctly received. For a Cell configured with the MIMO transmission mode, two HARQ-ACK bits are generated based on whether the downlink subframe corresponding to the Cell is correctly received, and the two HARQ-ACK bits are bundled into one HARQ-ACK bit through spatial bundling. Thus, the final result is that one HARQ-ACK bit is generated for each Cell and there are two HARQ-ACK bits for the two Cells.

In Step 303, the UE transmits the HARQ-ACK information generated in Step 302 to the base station adopting the transmission diversity technique.

If only the Pcell is scheduled, the transmission of the HARQ-ACK information to the base station includes the following two cases.

Case 1: If the Pcell is configured with the SIMO transmission mode, one HARQ-ACK bit is generated. Adopting the SORTD method, the one HARQ-ACK bit is transmitted in duplicate on antenna 0 and antenna 1 on different channels.

Suppose the index of the first CCE of the corresponding PDCCH is $n_{CCE}$, two HARQ-ACK channels may be mapped according to $n_{CCE}$ and $n_{CCE}+1$. The two HARQ-ACK channels are used for two transmission antennas, i.e., antenna 0 transmits on the HARQ-ACK channel mapped according to $n_{CCE}$, and antenna 1 transmits on the HARQ-ACK channel mapped according to $n_{CCE}+1$. The HARQ-ACK information transmitted on the two antennas are the same.

Alternatively, if the current subframe of the Pcell transmits a Semi-Persistent Scheduling (SPS) service, two HARQ-ACK channels are semi-statically configured by a higher layer. The two HARQ-ACK channels are denoted as CH_1 and CH_2. Adopting the SORTD method, i.e., the one HARQ-ACK bit is transmitted in duplicate on antenna 0 and antenna 1 on different channels. Antenna 0 transmits on CH_1 and antenna 1 transmits on CH_2. The HARQ-ACK information transmitted on the two antennas are the same.

Case 2: If the Pcell is configured with the MIMO transmission mode, two HARQ-ACK bits are generated. The two HARQ-ACK bits are transmitted in duplicate on antenna 0 and antenna 1 on different channels adopting the SORTD method.

Suppose the index of the first CCE of the PDCCH is $n_{CCE}$, two HARQ-ACK channels can be mapped according to $n_{CCE}$ and $n_{CCE}+1$. The two HARQ-ACK channels are used for the two antennas, i.e., antenna 0 transmits on the HARQ-ACK channel mapped according to $n_{CCE}$, and antenna 1 transmits on the HARQ-ACK channel mapped according to $n_{CCE}+1$. The HARQ-ACK information transmitted on the two antennas are the same.

If only the Scell is scheduled, and the Scell is configured with the SIMO transmission mode, one HARQ-ACK bit is generated. The one HARQ-ACK bit is transmitted in duplicate on antenna 0 and antenna 1 on different channels adopting the SORTD method. With respect to different scheduling methods, the mapping method of the PUCCH resource transmitting the HARQ-ACK information of the Scell includes the following two cases:

Case 1: If the PDSCH of the Scell is cross-carrier scheduled from the PDCCH of the Pcell, the PUCCH resource transmitting the HARQ-ACK information of the Scell is mapped by the PDCCH via a connotative method, i.e., two HARQ-ACK channels are mapped according to $n_{CCE}$ and $n_{CCE}+1$. The two HARQ-ACK channels are used for two transmission antennas, i.e., antenna 0 transmits on the HARQ-ACK channel mapped according to $n_{CCE}$, and antenna 1 transmits on the HARQ-ACK channel mapped according to $n_{CCE}+1$. The HARQ-ACK information transmitted on the two antennas are the same.

Case 2: If the PDSCH of the Scell is non-cross-carrier scheduled from the PDCCH of the Scell, the PUCCH resource transmitting the HARQ-ACK information of the Scell is indicated by the ARI in the PDCCH. Suppose the two HARQ-ACK channels indicated by the ARI are denoted as CH_1 and CH_2. The two HARQ-ACK channels are used for two transmission antennas, i.e., antenna 0 transmits on CH_1, and antenna 1 transmits on CH_2. The HARQ-ACK information transmitted on the two antennas are the same.

If only the Scell is scheduled, and the Scell is configured with the MIMO transmission mode, two HARQ-ACK bits are generated. The two HARQ-ACK bits are transmitted in duplicate on antenna 0 and antenna 1 on different channels adopting the SORTD method. With respect to different scheduling methods, the mapping method of the PUCCH resource transmitting the HARQ-ACK information of the Scell includes the following two cases:

Case 1: If the PDSCH of the Scell is cross-carrier scheduled from the PDCCH of the Pcell, the PUCCH resource transmitting the HARQ-ACK information of the Scell is mapped by the PDCCH via a connotative method, i.e., two HARQ-ACK channels are mapped according to $n_{CCE}$ and $n_{CCE}+1$. The two HARQ-ACK channels are used for two transmission antennas, i.e., antenna 0 transmits on the HARQ-ACK channel mapped according to $n_{CCE}$, and antenna 1 transmits on the HARQ-ACK channel mapped according to $n_{CCE}+1$. The HARQ-ACK information transmitted on the two antennas are the same.

Case 2: If the PDSCH of the Scell is non-cross-carrier scheduled from the PDCCH of the Scell, the PUCCH resource transmitting the HARQ-ACK information of the Scell is indicated by the ARI in the PDCCH. Suppose the two HARQ-ACK channels indicated by the ARI are denoted as CH_1 and CH_2. The two HARQ-ACK channels are used for two transmission antennas, i.e., antenna 0 transmits on CH_1, and antenna 1 transmits on CH_2. The HARQ-ACK information transmitted on the two antennas are the same.

If the Pcell and the Scell are scheduled at the same time, and the Pcell is configured with the SIMO transmission mode, one HARQ-ACK bit is generated. If the Pcell is configured with the MIMO transmission mode, two bits of HARQ-ACK information are generated and the two bits of HARQ-ACK information are bundled into one bit through spatial bundling. Whether the Pcell is configured with the SIMO transmission mode or MIMO transmission mode, one HARQ-ACK bit is finally generated for the Pcell, denoted as HARQ-ACK(0). Similarly, whether the Scell is configured with the SIMO transmission mode or the MIMO transmission mode, one HARQ-ACK bit is finally generated for the Scell, denoted as HARQ-ACK(1). Thus, two HARQ-ACK bits are generated for the Pcell and the Scell, denoted as {HARQ-ACK(0), HARQ-ACK(1)}. Two channels are mapped for the Pcell and the Scell respectively adopting the SORTD method. There are four channels altogether.

In particular, the mapping method of the two channels of the Pcell is as follows: if the current subframe of the Pcell transmits an SPS service, the two channels of the Pcell is obtained by semi-static configuration of the higher layer, denoted as CH_1 and CH_2; otherwise, the two channels of the Pcell are mapped according to the index $n_{CCE}$ of first CCE of the PDCCH scheduling the PDSCH of the Pcell and the index $n_{CCE}+1$ of the second CCE of the PDCCH scheduling the PDSCH of the Pcell, also denoted as CH_1 and CH_2.

The mapping method of the two channels of the Scell is as follows: if the PDSCH of the Scell is cross-carrier scheduled by the PDCCH of the Pcell, the two channels of the Scell is mapped according to the first CCE index $n_{CCE}$ and the second CCE index $n_{CCE}+1$ of the PDCCH of the Pcell scheduling the PDSCH of the Scell, denoted as CH_3 and CH_4; if the PDSCH of the Scell is non-cross-carrier scheduled from the PDCCH of the Scell, the two channels of the Scell are indicated by the ARI in the PDCCH scheduling the PDSCH of the Scell, also denoted as CH_3 and CH_4.

For FDD systems, bit mapping and resource mapping relationships when HARQ-ACK information is transmitted on antenna 0 adopting the SORTD technique are shown in Table 3:

TABLE 3

| Pcell HARQ-ACK(0) | Scell HARQ-ACK(1) | $n_{PUCCH,i}^{(1)}$ | b(0)b(1) |
|---|---|---|---|
| ACK | ACK | CH_3 | 1, 1 |
| ACK | NACK/DTX | CH_1 | 1, 1 |
| NACK/DTX | ACK | CH_3 | 0, 0 |
| NACK | NACK/DTX | CH_1 | 0, 0 |
| DTX | NACK/DTX | No transmission | |

Bit mapping and resource mapping relationships when HARQ-ACK information is transmitted on antenna 1 are shown in Table 4:

TABLE 4

| Pcell HARQ-ACK(0) | Scell HARQ-ACK(1) | $n_{PUCCH,i}^{(1)}$ | b(0)b(1) |
|---|---|---|---|
| ACK | ACK | CH_4 | 1, 1 |
| ACK | NACK/DTX | CH_2 | 1, 1 |
| NACK/DTX | ACK | CH_4 | 0, 0 |
| NACK | NACK/DTX | CH_2 | 0, 0 |
| DTX | NACK/DTX | No transmission | |

For TDD systems with HARQ-ACK bundling window of 1, bit mapping and resource mapping relationships when HARQ-ACK information is transmitted on antenna 0 adopting the SORTD technique are shown in Table 5:

TABLE 5

| HARQ-ACK(0), HARQ-ACK(1) | $n_{PUCCH}^{(1)}$ | b(0)b(1) |
|---|---|---|
| ACK, ACK | CH_3 | 1, 0 |
| ACK, NACK/DTX | CH_1 | 1, 1 |
| NACK/DTX, ACK | CH_3 | 0, 1 |
| NACK, NACK/DTX | CH_1 | 0, 0 |
| DTX, NACK/DTX | | No transmission |

Bit mapping and resource mapping relationships when HARQ-ACK information is transmitted on antenna 1 are shown in Table 6:

TABLE 6

| HARQ-ACK(0), HARQ-ACK(1) | $n_{PUCCH}^{(1)}$ | b(0)b(1) |
|---|---|---|
| ACK, ACK | CH_4 | 1, 0 |
| ACK, NACK/DTX | CH_2 | 1, 1 |
| NACK/DTX, ACK | CH_4 | 0, 1 |
| NACK, NACK/DTX | CH_2 | 0, 0 |
| DTX, NACK/DTX | | No transmission |

It can be seen from the above that, in the method provided by the present invention, through indicating in the PDCCH whether data of another CC is scheduled in the same subframe, the UE is able to know the number of Cells scheduled by the base station in the same downlink subframe and to generate HARQ-ACK information based on the number of Cells. Then the UE transmits the generated HARQ-ACK information to the base station adopting the transmission diversity technique. According to the present invention, spatial bundling is prevented from being used when there is only one CC is scheduled. Thus, unnecessary downlink data retransmission is reduced and throughput of downlink data is improved.

While the present invention has been illustrated and described with reference to certain embodiments thereof, it will be understood by those skilled in the art that various changes in form and details may be made therein without departing from the spirit and scope of the present invention as defined by the appended claims and their equivalents.

What is claimed is:

1. A method for transmitting, by a user equipment (UE), hybrid automatic retransmission request-acknowledgement (HARQ-ACK) information, comprising:
   obtaining first information for a number of cells scheduled by a base station in a subframe;
   obtaining second information for whether a scheduled cell is cross-carrier scheduled;
   obtaining third information for whether data transmitted by the scheduled cell is semi-persistent scheduling (SPS) data;
   receiving data based on at least two of the first information, the second information, and the third information from the base station in the subframe;
   generating HARQ-ACK information based on the first information and whether the data is correctly received; and
   transmitting the HARQ-ACK information to the base station using at least one resource determined based on at least one of the second information and the third information.

2. The method of claim 1, wherein the scheduled cell is a component carrier.

3. The method of claim 1, wherein a number of HARQ-ACK information bits is proportional to the number of cells.

4. The method of claim 1, wherein the number of cells is predefined.

5. The method of claim 4, wherein a number of HARQ-ACK information bits is defined based on a transmission mode of each cell, and the transmission mode is one of a single input multiple output (SIMO) transmission mode and a multiple input multiple output (MIMO) transmission mode.

6. The method of claim 1, wherein transmitting the HARQ-ACK information to the base station comprises:
   if a spatial orthogonal resource transmission diversity (SORTD) method is used, then transmitting the HARQ-ACK information in duplicate on a first antenna and a second antenna.

7. The method of claim 6, wherein if the data transmitted by the scheduled cell is the SPS data, two semi-static configured channels are used for transmitting the HARQ-ACK information, wherein the two semi-static configured channels correspond to the first antenna and the second antenna, respectively; and
   if the data transmitted by the scheduled cell is not the SPS data, the first antenna transmits HARQ-ACK information mapped according to $n_{CCE}$, and the second antenna transmits HARQ-ACK information mapped according to $n_{CCE}+1$, wherein $n_{CCE}$ denotes an index of a first control channel element (CCE) of a downlink control channel.

8. The method of claim 6, wherein if the scheduled cell is cross-carrier scheduled, the first antenna transmits HARQ-ACK information mapped according to $n_{CCE}$, and the second antenna transmits HARQ-ACK information mapped according to $n_{CCE}+1$, wherein $n_{CCE}$ denotes an index of a first control channel element (CCE) of a downlink control channel; and
   if the scheduled cell is not cross-carrier scheduled, two channels are indicated by HARQ-ACK resource information (ARI) in a control information, and the two channels correspond to the first antenna and the second antenna, respectively.

9. The method of claim 6, wherein for a frequency division duplex (FDD) system, if the HARQ-ACK information is transmitted on the first antenna, bit mapping and resource mapping relationships are as follows:

| Pcell HARQ-ACK(0) | Scell HARQ-ACK(1) | $n_{PUCCH,i}^{(1)}$ | b(0)b(1) |
|---|---|---|---|
| ACK | ACK | CH_3 | 1, 1 |
| ACK | NACK/DTX | CH_1 | 1, 1 |
| NACK/DTX | ACK | CH_3 | 0, 0 |
| NACK | NACK/DTX | CH_1 | 0, 0 |
| DTX | NACK/DTX | | No transmission, | and wherein,
   HARQ-ACK(0) denotes the HARQ-ACK information of a Pcell as a first scheduled cell;
   HARQ-ACK(1) denotes the HARQ-ACK information of an Scell as a second scheduled cell;
   CH_1 is a resource corresponding to the Pcell, and CH_3 is a resource corresponding to the Scell; and
   $b(0)b(1)$ denotes HARQ-ACK bits being transmitted.

10. The method of claim 9, wherein if the HARQ-ACK information is transmitted on the second antenna, bit mapping and resource mapping relationships are as follows:

| Pcell HARQ-ACK(0) | Scell HARQ-ACK(1) | $n_{PUCCH,i}^{(1)}$ | b(0)b(1) |
|---|---|---|---|
| ACK | ACK | CH_4 | 1, 1 |
| ACK | NACK/DTX | CH_2 | 1, 1 |
| NACK/DTX | ACK | CH_4 | 0, 0 |
| NACK | NACK/DTX | CH_2 | 0, 0 |
| DTX | NACK/DTX | No transmission | |

CH_2 is a resource corresponding to the Pcell, and CH_4 is a resource corresponding to the Scell.

11. A user equipment (UE), comprising:
a receiver;
a controller configured to obtain first information for a number of cells scheduled by a base station in a subframe, to obtain second information for whether a scheduled cell is cross-carrier scheduled, to obtain third information for whether data transmitted by the scheduled cell is semi-persistent scheduling (SPS) data, to control the receiver for receiving data based on at least two of the first information, the second information, and the third information from the base station in the subframe, and to generate hybrid automatic retransmission request-acknowledgement (HARQ-ACK) information based on the first information and whether the data is correctly received; and
a transmitter configured to transmit the HARQ-ACK information to the base station using at least one resource determined based on at least one of the second information and the third information.

12. The UE of claim 11, wherein the scheduled cell is a component carrier.

13. The UE of claim 11, wherein a number of HARQ-ACK information bits is proportional to the number of cells.

14. The UE of claim 11, wherein the number of cells is predefined.

15. The UE of claim 11, wherein a number of HARQ-ACK information bits is defined based on a transmission mode of each cell, and the transmission mode is one of a single input multiple output (SIMO) transmission mode and a multiple input multiple output (MIMO) transmission mode.

16. The UE of claim 11, wherein the transmitter is configured to transmit the HARQ-ACK information in duplicate on a first antenna and a second antenna, if a spatial orthogonal resource transmission diversity (SORTD) method is used.

17. The UE of claim 16, wherein if the data transmitted by the scheduled cell is the SPS data, two semi-static configured channels are used for transmitting the HARQ-ACK information, wherein the two semi-static configured channels correspond to the first antenna and the second antenna, respectively; and
if the data transmitted by the scheduled cell is not the SPS data, the first antenna transmits HARQ-ACK information mapped according to $n_{CCE}$, and the second antenna transmits HARQ-ACK information mapped according to $n_{CCE}+1$, wherein $n_{CCE}$ denotes an index of a first control channel element (CCE) of a downlink control channel.

18. The UE of claim 16, wherein if the scheduled cell is cross-carrier scheduled, a first antenna transmits the HARQ-ACK information mapped according to $n_{CCE}$, and a second antenna transmits the HARQ-ACK information mapped according to $n_{CCE}+1$, wherein $n_{CCE}$ denotes an index of a first control channel element (CCE) of a downlink control channel; and if the scheduled cell is not cross-carrier scheduled, two channels are indicated by HARQ-ACK resource information (ARI) in a control information, and the two channels correspond to the first antenna and the second antenna, respectively.

19. The UE of claim 18, wherein for a frequency division duplex (FDD) system, if the HARQ-ACK information is transmitted on the first antenna, bit mapping and resource mapping relationships are as follows:

| Pcell HARQ-ACK(0) | Scell HARQ-ACK(1) | $n_{PUCCH,i}^{(1)}$ | b(0) b(1) |
|---|---|---|---|
| ACK | ACK | CH_3 | 1,1 |
| ACK | NACK/DTX | CH_1 | 1,1 |
| NACK/DTX | ACK | CH_3 | 0,0 |
| NACK | NACK/DTX | CH_1 | 0,0 |
| DTX | NACK/DTX | No transmission, | | and wherein,
HARQ-ACK(0) denotes the HARQ-ACK information of a Pcell as a first scheduled cell;
HARQ-ACK(1) denotes the HARQ-ACK information of an Scell as a second scheduled cell;
CH _1 is a resource corresponding to the Pcell, and CH_3 is a resource corresponding to the Scell; and
$b(0)b(1)$ denotes HARQ-ACK bits being transmitted.

20. The UE of claim 19, wherein if the HARQ-ACK information is transmitted on the second antenna, bit mapping and resource mapping relationships are as follows:

| Pcell HARQ-ACK(0) | Scell HARQ-ACK(1) | $n_{PUCCH}^{(1)}$ | b(0)b(1) |
|---|---|---|---|
| ACK | ACK | CH_4 | 1, 1 |
| ACK | NACK/DTX | CH_2 | 1, 1 |
| NACK/DTX | ACK | CH_4 | 0, 0 |
| NACK | NACK/DTX | CH_2 | 0, 0 |
| DTX | NACK/DTX | No transmission | |

CH_2 is a resource corresponding to the Pcell, and CH_4 is a resource corresponding to the Scell.

21. A method for receiving, by a base station, hybrid automatic retransmission request-acknowledgement (HARQ-ACK) information, comprising:
transmitting, to a user equipment (UE), first information for a number of cells scheduled by the base station in a subframe;
transmitting, to the UE, second information for whether a scheduled cell is cross-carrier scheduled;
transmitting, to the UE, third information for whether data transmitted by the scheduled cell is semi-persistent scheduling (SPS) data;
transmitting data based on at least two of the first information, the second information, and the third information in the subframe; and
receiving, from the UE, HARQ-ACK information generated based on the first information and whether the data is correctly received in the UE,
wherein the HARQ-ACK information is received using at least one resource determined based on at least one of the second information and the third information.

22. The method of claim 21, wherein the scheduled cell is a component carrier.

23. The method of claim 21, wherein a number of HARQ-ACK information bits is proportional to the number of cells.

24. The method of claim 21, wherein the number of cells is predefined.

25. The method of claim 24, wherein a number of HARQ-ACK information bits is defined based on a transmission mode of each cell, and the transmission mode is one of a single input multiple output (SIMO) transmission mode and a multiple input multiple output (MIMO) transmission mode.

26. The method of claim 21, wherein receiving the HARQ-ACK information comprises:
if a spatial orthogonal resource transmission diversity (SORTD) method is used, then receiving the HARQ-ACK information transmitted in duplicate on a first antenna and a second antenna of the UE.

27. The method of claim 26, wherein if the data transmitted by the scheduled cell is the SPS data, two semi-static configured channels are used in the UE for transmitting the HARQ-ACK information, wherein the two semi-static configured channels correspond to the first antenna and the second antenna, respectively; and
if the data transmitted by the scheduled cell is not the SPS data, the first antenna transmits HARQ-ACK information mapped according to $n_{CCE}$, and the second antenna transmits HARQ-ACK information mapped according to $n_{CCE}+1$, wherein $n_{CCE}$ denotes an index of a first control channel element (CCE) of a downlink control channel.

28. The method of claim 26, wherein if the scheduled cell is cross-carrier scheduled, the first antenna transmits the HARQ-ACK information mapped according to $n_{CCE}$ and the second antenna transmits the HARQ-ACK information mapped according to $n_{CCE}+1$, wherein $n_{CCE}$ denotes an index of a first control channel element (CCE) of a downlink control channel; and
if the scheduled cell is not cross-carrier scheduled, two channels are indicated by HARQ-ACK resource information (ARI) in a control information, and the two channels correspond to the first antenna and the second antenna, respectively.

29. The method of claim 26, wherein for a frequency division duplex (FDD) system, if the HARQ-ACK information is transmitted on the first antenna, bit mapping and resource mapping relationships are as follows:

| Pcell HARQ-ACK(0) | Scell HARQ-ACK(1) | $n_{PUCCH}^{(1)}$ | b(0)b(1) |
|---|---|---|---|
| ACK | ACK | CH_3 | 1, 1 |
| ACK | NACK/DTX | CH_1 | 1, 1 |
| NACK/DTX | ACK | CH_3 | 0, 1 |
| NACK | NACK/DTX | CH_1 | 0, 0 |
| DTX | NACK/DTX | No transmission, | | and wherein,
HARQ-ACK(0) denotes the HARQ-ACK information of a Pcell as a first scheduled cell;
HARQ-ACK(1) denotes the HARQ-ACK information of an Scell as a second scheduled cell;
CH_1 is a resource corresponding to the Pcell, and CH_3 is a resource corresponding to the Scell; and
$b(0)b(1)$ denotes HARQ-ACK bits being transmitted.

30. The method of claim 29, wherein if the HARQ-ACK information is transmitted on the second antenna, bit mapping and resource mapping relationships are as follows:

| Pcell HARQ-ACK(0) | Scell HARQ-ACK(1) | $n_{PUCCH,i}^{(1)}$ | b(0) b(1) |
|---|---|---|---|
| ACK | ACK | CH_4 | 1,1 |
| ACK | NACK/DTX | CH_2 | 1,1 |
| NACK/DTX | ACK | CH_4 | 0,0 |
| NACK | NACK/DTX | CH_2 | 0,0 |
| DTX | NACK/DTX | No transmission | |

CH_2 is a resource corresponding to the Pcell, and CH_4 is a resource corresponding to the Scell.

31. A base station, comprising:
a transmitter configured to transmit, to a user equipment (UE), first information for a number of cells scheduled by the base station in a subframe, transmit, to the UE, second information for whether a scheduled cell is cross-carrier scheduled, transmit, to the UE, third information for whether data transmitted by the scheduled cell is semi-persistent scheduling (SPS) data, and transmit data based on at least two of the first information, the second information, and the third information in the subframe; and
a receiver configured to receive, from the UE, hybrid automatic retransmission request-acknowledgement (HARQ-ACK) information generated based on the first information and whether the data is correctly received in the UE,
wherein the HARQ-ACK information is received using at least one resource determined based on at least one of the second information and the third information.

32. The base station of claim 31, wherein the scheduled cell is a component carrier.

33. The base station of claim 31, wherein a number of HARQ-ACK information bits is proportional to the number of cells.

34. The base station of claim 31, wherein the number of cells is predefined.

35. The base station of claim 34, wherein a number of HARQ-ACK information bits is defined based on a transmission mode of each cell, and the transmission mode is one of a single input multiple output (SIMO) transmission mode and a multiple input multiple output (MIMO) transmission mode.

36. The base station of claim 31, wherein the receiver is configured to receive the HARQ-ACK information transmitted in duplicate on a first antenna and a second antenna of the UE, if a spatial orthogonal resource transmission diversity (SORTD) method is used.

37. The base station of claim 36, wherein if the data transmitted by the scheduled cell is the SPS data, two semi-static configured channels are used in the UE for transmitting the HARQ-ACK information, wherein the two semi-static configured channels correspond to the first antenna and the second antenna, respectively; and
if the data transmitted by the scheduled cell is not the SPS data, the first antenna transmits HARQ-ACK information mapped according to $n_{CCE}$, and the second antenna transmits HARQ-ACK information mapped according to $n_{CCE}+1$, wherein $n_{CCE}$ denotes an index of a first control channel element (CCE) of a downlink control channel.

38. The base station of claim 36, wherein if the scheduled cell is cross-carrier scheduled, the first antenna transmits the HARQ-ACK information mapped according to $n_{CCE}$, and the second antenna transmits the HARQ-ACK information mapped according to $n_{CCE}+1$, wherein $n_{CCE}$ denotes an index of a first control channel element (CCE) of a downlink control channel; and if the scheduled cell is not cross-carrier scheduled, two channels are indicated by HARQ-ACK resource information (ARI) in a control information, and the two channels correspond to the first antenna and the second antenna, respectively.

39. The base station of claim 36, wherein for a frequency division duplex (FDD) system, if the HARQ-ACK information is transmitted on the first antenna, bit mapping and resource mapping relationships are as follows:

| Pcell HARQ-ACK(0) | Scell HARQ-ACK(1) | $n_{PUCCH}^{(1)}$ | b(0) b(1) |
|---|---|---|---|
| ACK | ACK | CH_3 | 1,1 |
| ACK | NACK/DTX | CH_1 | 1,1 |
| NACK/DTX | ACK | CH_3 | 0,0 |
| NACK | NACK/DTX | CH_1 | 0,0 |
| DTX | NACK/DTX | | No transmission, | and wherein,

HARQ-ACK(0) denotes the HARQ-ACK information of a Pcell as a first scheduled cell;

HARQ-ACK(1) denotes the HARQ-ACK information of an Scell as a second scheduled cell;

CH_1 is a resource corresponding to the Pcell, and CH_3 is a resource corresponding to the Scell; and $b(0)b(1)$ denotes HARQ-ACK bits being transmitted.

40. The base station of claim 39, wherein if the HARQ-ACK information is transmitted on the second antenna, bit mapping and resource mapping relationships are as follows:

| Pcell HARQ-ACK(0) | Scell HARQ-ACK(1) | $n_{PUCCH}^{(1)}$ | b(0) b(1) |
|---|---|---|---|
| ACK | ACK | CH_4 | 1,1 |
| ACK | NACK/DTX | CH_2 | 1,1 |
| NACK/DTX | ACK | CH_4 | 0,0 |
| NACK | NACK/DTX | CH_2 | 0,0 |
| DTX | NACK/DTX | | No transmission |

CH_2 is a resource corresponding to the Pcell, and CH_4 is a resource corresponding to the Scell.

* * * * *